United States Patent
Hamilton

(10) Patent No.: US 11,500,853 B1
(45) Date of Patent: Nov. 15, 2022

(54) VIRTUAL DATA STORE SYSTEMS AND METHODS

(71) Applicant: Live Data Technologies, Inc., Santa Barbara, CA (US)

(72) Inventor: James Scott Hamilton, Santa Barbara, CA (US)

(73) Assignee: Live Data Technologies, Inc., Santa Barbara, CA (US)

( * ) Notice: Subject to any disclaimer, the term of this patent is extended or adjusted under 35 U.S.C. 154(b) by 0 days.

(21) Appl. No.: 17/446,078

(22) Filed: Aug. 26, 2021

Related U.S. Application Data

(60) Provisional application No. 63/074,707, filed on Sep. 4, 2020.

(51) Int. Cl.
   *G06F 16/23* (2019.01)
   *G06F 16/245* (2019.01)

(52) U.S. Cl.
   CPC ........ *G06F 16/2365* (2019.01); *G06F 16/245* (2019.01)

(58) Field of Classification Search
   CPC ............................ G06F 16/2365; G06F 16/245
   See application file for complete search history.

(56) References Cited

U.S. PATENT DOCUMENTS

| | | | | |
|---|---|---|---|---|
| 9,064,339 B2* | 6/2015 | Ziemann | ................ | G06T 11/20 |
| 10,904,175 B1* | 1/2021 | Jones | ................ | H04L 67/306 |
| 2008/0205655 A1* | 8/2008 | Wilkins | ................ | G06F 16/27 |
| | | | | 707/999.005 |
| 2013/0217365 A1* | 8/2013 | Ramnani | ................ | H04L 67/306 |
| | | | | 455/414.1 |
| 2013/0263227 A1 | 10/2013 | Gongaware et al. | | |
| 2013/0311283 A1 | 11/2013 | Liu et al. | | |
| 2014/0066044 A1* | 3/2014 | Ramnani | ................ | H04L 67/306 |
| | | | | 455/418 |
| 2014/0089189 A1 | 3/2014 | Vasireddy et al. | | |
| 2014/0237570 A1 | 8/2014 | Shishkov et al. | | |
| 2014/0250145 A1 | 9/2014 | Jones et al. | | |
| 2015/0032738 A1* | 1/2015 | Nachnani | ................ | G06F 16/38 |
| | | | | 707/723 |
| 2015/0100356 A1* | 4/2015 | Bessler | ................ | G06Q 10/0631 |
| | | | | 705/7.12 |
| 2015/0128287 A1 | 5/2015 | LaFever et al. | | |

(Continued)

*Primary Examiner* — Alicia M Willoughby
(74) *Attorney, Agent, or Firm* — Knobbe, Martens, Olson & Bear LLP

(57) ABSTRACT

A virtual data store system comprises a network interface and a processing device operable to access a source database of data records comprising data, wherein an entity is enabled to utilize the virtual data store system as a database. A verification query is formulated with respect to a data record, that stores an item of data, which is transmitted to online network sources via a proxy service. A query response is parsed and in response to determining that the item of data in the data record is potentially present in the parsed response, a corresponding confidence score is generated. If the confidence score is below a first threshold, a subsequent verification operation is performed. If the subsequent verification operation fails, the second item of data is deleted from memory to conserve memory resources. The data record may be accessed from the virtual data store and used to initiate a networked communication.

21 Claims, 5 Drawing Sheets

(56) References Cited

U.S. PATENT DOCUMENTS

| | | | |
|---|---|---|---|
| 2015/0205842 A1* | 7/2015 | Jain | G06F 16/22 |
| | | | 707/732 |
| 2015/0234830 A1* | 8/2015 | Bergman | G06Q 30/02 |
| | | | 707/749 |
| 2016/0155148 A1 | 6/2016 | Ismail et al. | |
| 2016/0171093 A1* | 6/2016 | Benati | G06F 40/205 |
| | | | 707/755 |
| 2016/0337278 A1* | 11/2016 | Peruri | G06F 16/288 |
| 2017/0188232 A1 | 6/2017 | Raleigh et al. | |
| 2017/0364547 A1* | 12/2017 | Szymanski | G06F 40/232 |
| 2018/0276280 A1* | 9/2018 | Trudel | G06F 16/2456 |

\* cited by examiner

VIRTUAL DATA STORE SYSTEMS AND METHODS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND OF THE INVENTION

Field of the Invention

The present disclosure generally relates to virtual data store systems and methods.

Description of the Related Art

Big data has become ever more important to all facets of life, including in the scientific space, the medical space, and the social network space. However, data often goes stale, resulting in the greatly inefficient use of memory resources in storing such stale data, the greatly inefficient use of computer processing resources in processing such stale data, and greatly inefficient use of network resources in transmitting inaccurate data that is based on such stale data.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A virtual data store system comprises a network interface and a processing device operable to access a source database of data records comprising data, wherein an entity is enabled to utilize the virtual data store system as a database. A verification query is formulated with respect to a data record, that stores an item of data, which is transmitted to online network sources via a proxy service. A query response is parsed and in response to determining that the item of data in the data record is potentially present in the parsed response, a corresponding confidence score is generated. If the confidence score is below a first threshold, a subsequent verification operation is performed. If the subsequent verification operation fails, the second item of data is deleted from memory to conserve memory resources. The data record may be accessed from the virtual data store and used to initiate a networked communication.

An aspect of the present disclosure relates to a virtual data store system, comprising: a network interface; at least one processing device operable to: access, using the network interface, a source database of existing data of a plurality of contact records comprising contact data and one or more additional attributes, wherein the source database is associated with a first entity that is enabled to utilize the virtual data store system as a contact database of the first entity; dynamically formulate a verification query with respect to a first contact record in the source database; transmit, over a network using the network interface, the dynamically formulated verification query to one or more online network sources via a proxy service to aid in enhancing load balancing; receive a response, via the proxy service, to the dynamically formulated verification query; parse the response to the dynamically formulated verification query and generate a corresponding decision tree; using the decision tree, determine that a first item of data missing from the first contact record is present in the parsed response; at least party in response to determining that the first item of data missing from the first contact record is present in the parsed response, supplement the first contact record with the first item of data from the parsed response; at least party in response to determining that a second item of data in the first contact record is potentially present in the parsed response, generate a corresponding confidence score that indicates a likelihood the second item of data is present in the parsed response, determine if the confidence score that indicates a likelihood the second item of data is present in the parsed response is below a first threshold, at least partly in response to determining that the confidence score is below the first threshold, perform a subsequent verification operation to verify that the second item of data is present in the parsed response, at least partly in response to determining that the subsequent verification operation failed to determine that the second item of data is present in the parsed response that, delete the second item of data from memory to conserve memory resources; at least party in response to determining that a third item of data in the first contact record is present in the parsed response, record a verification indication associated with the third item of data; and enable the first entity to utilize the first contact record to transmit an electronic communication to an electronic destination associated with the first contact record.

An aspect of the present disclosure relates to a computerized method, the method comprising: accessing, using computer system via a network interface, a source database of existing data of a plurality of contact records comprising contact data and one or more additional attributes, wherein the source database is associated with a first entity; dynamically formulating a verification query with respect to a first contact record in the source database; transmitting, over a network using the network interface, the dynamically formulated verification query to one or more online network sources; receiving a response to the dynamically formulated verification query; parsing the response to the dynamically formulated verification query; determining that a first item of data missing from the first contact record is present in the parsed response; at least partly in response to determining that the first item of data missing from the first contact record is present in the parsed response, supplementing the first contact record with the first item of data from the parsed response; at least partly in response to determining that a second item of data in the first contact record is potentially present in the parsed response, generate a corresponding confidence score that indicates a likelihood the second item of data is present in the parsed response, determine if the confidence score that indicates a likelihood the second item of data is present in the parsed response is below a first threshold, at least partly in response to determining that the confidence score is below the first threshold, perform a subsequent verification operation to verify that the second item of data is present in the parsed response, at least partly in response to determining that the subsequent verification operation failed to determine that the second item of data is present in the parsed response that, enabling the second item of data to be overwritten; at least partly in response to determining that a third item of data in the first contact record is present in the parsed response, recording a verification indication associated with the third item of data; and enabling the first entity to utilize the first contact record to transmit an electronic communication to an electronic destination associated with the first contact record.

An aspect of the present disclosure relates to a non-transitory computer-readable medium comprising instructions that when executed by a computer device, cause the computer device to perform operations comprising: accessing, a source database of existing data of a plurality of data records comprising contact data and one or more additional attributes, wherein the source database is associated with a first entity; dynamically formulating a verification query with respect to a first data record in the source database; transmitting the dynamically formulated verification query to one or more online network sources; receiving a response to the dynamically formulated verification query; parsing the response to the dynamically formulated verification query; determining that a first item of data missing from the first data record is present in the parsed response; at least partly in response to determining that the first item of data missing from the first data record is present in the parsed response, supplementing the first data record with the first item of data from the parsed response; at least partly in response to determining that a second item of data in the first data record is potentially present in the parsed response, generating a corresponding confidence score that indicates a likelihood the second item of data is present in the parsed response, determine if the confidence score that indicates a likelihood the second item of data is present in the parsed response is below a first threshold, at least partly in response to determining that the confidence score is below the first threshold, perform a subsequent verification operation to verify that the second item of data is present in the parsed response; at least partly in response to determining that the subsequent verification operation failed to determine that the second item of data is present in the parsed response that, enabling the second item of data to be overwritten; and enabling the first entity to utilize the first data record to transmit an electronic communication to an electronic destination associated with the first data record.

Figure 1:
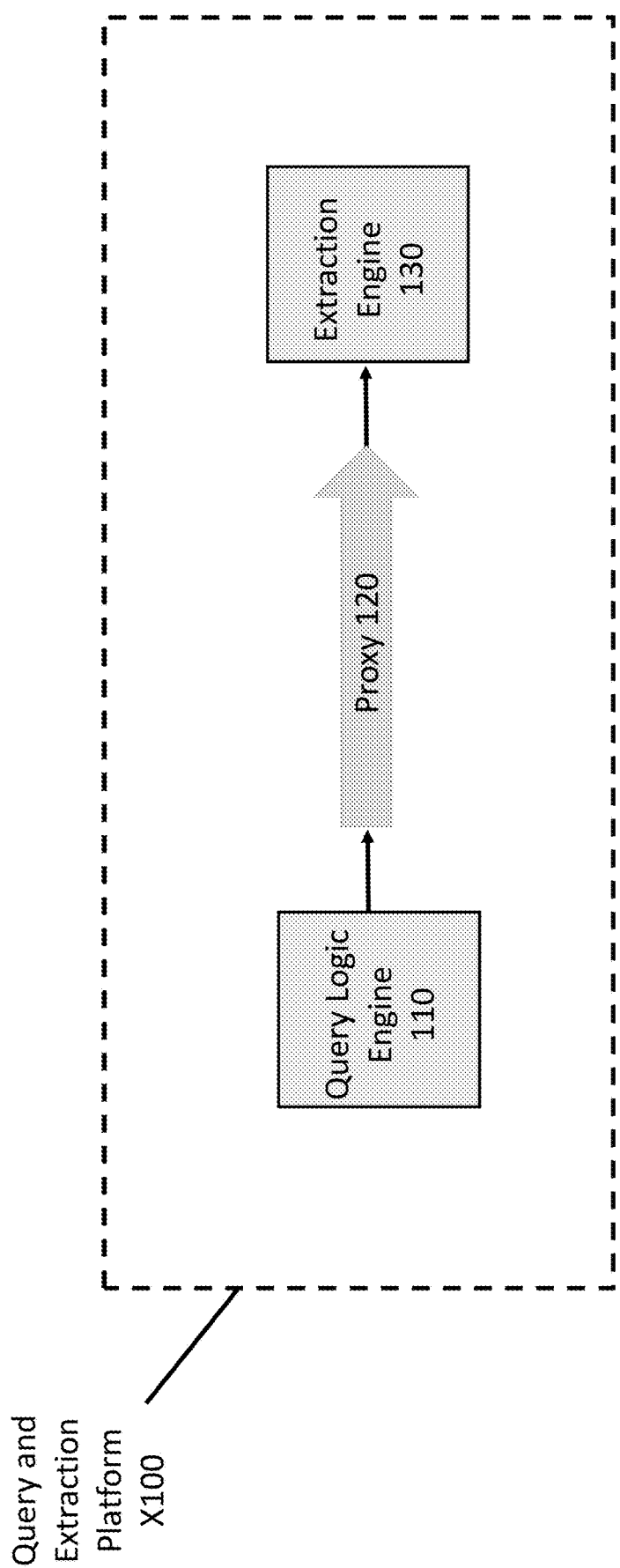
FIG. 1 illustrates a high-level block diagram of an example embodiment of Query and Extraction platform.

The following detailed description references the accompanying drawings that illustrate specific embodiments in which the disclosed technologies can be practiced. The embodiments are intended to describe aspects of the disclosed technologies in sufficient detail to enable those skilled in the art to practice the disclosed technologies. Other embodiments can be utilized and changes can be made without departing from the scope of the present invention. The following detailed description is, therefore, not to be taken in a limiting sense.

DETAILED DESCRIPTION

Aspects of the present disclosure relate to improved contact relationship management systems, more particularly, to methods and systems for dynamically enhancing the efficient utilization of memory and communication resources and for improving the quality of data stored in said systems.

Big data is an important aspect in the scientific, medical, social networking, and business fields. For example, sales and marketing is a critical function in business enterprises. In many enterprises, sales and marketing costs exceed forty percent of the enterprises operating budgets, which over the long term is unsustainable. Further, a significant amount of computer resources, including processing, memory, and network resources, are needed to implement sales and marketing activities. Technical techniques that can aid an enterprise in reducing their customer acquisition costs and/or improve their overall return on investment in sales and marketing can foster dramatic growth and substantially increase the enterprise's competitive position. As a result, there has been a substantial market growth in computer-based customer relationship management systems over the past 10 years.

Conventionally, Customer Relation Management (CRM) systems enable an enterprise to automate certain sales, marketing, and customer service interactions with current and potential future customers. In certain CRM systems customer prospects are directed via one or more marketing campaigns through one or more funnels in which there are a cascading series of customer interactions in which in the ideal, a relationship is established with an enterprise including a potential sale. Many CRM systems enable an enterprise to account for the costs and/or profit of certain sales and marketing programs/funnel. CRM systems further enable an enterprise to manage the customer relationship post-sale, including harvesting the enterprise's customer base for new sales, upgrades, add-ons, etc.

The CRM system may also play a role in an enterprise's visibility into and automation of customer support over the life of a product and/or service. The terms campaign and marketing campaign, as described herein, are intended to encompass generally any enterprise work flow process used to achieve a one or more objectives. Optionally, a campaign includes a certain collection of discreet events or steps (e.g., the sending of an email message to customer or customer prospect). The terms campaign and marketing campaign as used herein are intended to be used interchangeably. For example, a campaign may include a marketing campaign to promote a good or service with an intention of a sale. In another example campaign, a marketing campaign is used to promote a company's brand. In yet another example, a notification campaign is used to notify a customer/user of a change in a company's terms and conditions or a new product or service feature. While the term campaign may be used herein with respect to certain embodiments for illustrative purposes, other types of campaigns may be used as well.

CRM systems generally include certain technologies including data storage. Conventionally, CRM systems store, for example but not limited to: customer prospect data, marketing and sales campaign transactions, customer profile data, contact data, product and service information, personalization attributes, etc. While these systems are much improved over early means of generating customer demand and managing generated leads, current conventional systems are generally expensive and the data stored in CRM systems, while generally seeded with clean data, the data may atrophy and become incomplete and/or erroneous data. In addition, the storage of such out of date and erroneous data occupies valuable memory storage, and may also cause access to other data to occur more slowly.

Further with respect to customer acquisition and marketing campaigns, customer leads may be purchased from certain sales lead providers. These providers offer consumer and business-to-business leads which may be used, for example, in campaigns including: direct mail, phone, email, paid search, multi-channel marketing, etc. Generally, the contact profile of these lead data stores may include consumer age, income, home value, marital status, zip code, and other demographic and psychographic data. Business lead data stores may include, for example, industry, NAICS/SIC codes, number of employees, contact title, business expense, revenue, sales volume, credit rating, geography, and other firmographic, demographic, and psychographic data. While these lead and customer data base providers may make certain attempts to maintain the accuracy and integrity of the data, these attempts are often inadequate and result in stale data. SalesForce™ for example estimates that bad contact data costs US enterprise companies $700 B per year. Instances of bad contact data include, for example, 90% of contact records have incomplete data, 74% of sales leads need updates, and 20% of leads are essentially useless. Further, managing bad (e.g., out dated or erroneous) contact data can be expensive. For example, 21% of sales personnel time is spent correcting bad data, which is an inefficient use of manpower and computer resources. For example, such sales personnel time may be better utilizing in performing selling the goods and services at issue. By way of further illustration as to the technical challenges posed by maintaining accurate, up to date, contact data, with respect to Business-to-Business contact data, HubSpot™, a CRM provider, reports that as much as 2.1% of enterprise contact data decays (e.g., becomes incomplete or erroneous) every month and as much as 28.3% decays annually. Disadvantageously, these purchased and enterprise managed lead-based data stores contact leads for individuals and entities that have little to no interest in a company's products and/or services. Even worse, there are prospects which have a strong interest in an enterprise's products and services but the system is populated with bad contact data and so the current contact information for such appropriate contacts may not be in the data store, and/or the contact information for such appropriate prospects may be buried amongst bad contact data or contact data for non-relevant prospects (and so it may take much longer for the appropriate prospects to be contacted).

There is a need for systems and methods to address the decay of customer data including existing customers and customer leads and wherein the customer data broadly encompasses contact information and profile data. Advantageously, the systems described herein provide automated, efficient, and accurate processes that keep campaign and current customer data bases up-to-date. Further, the systems and methods described herein enable enterprises to rely on real-time transactional confirmations of contact management data thereby creating a virtual web data store of contact and profile relating to parties of interest to the enterprise. Further, systems and methods described herein provide technical solutions to reducing the inefficient use of data storage device by reducing the amount of memory used to store bad data. Still further, the described systems and methods reduce the utilization of electronic communication systems (e.g., email systems, telephone systems, short messaging service systems, web servers, and the like) that would otherwise be utilized in failed attempts to transmit communications to prospects utilizing bad contact data.

A detailed description of an automated query and extraction platform which uses novel methods and systems is presented herein. The disclosed systems and methods provide optimized query logic to advantageously enhance/maximize yield, which can provide consistent throughput via a proxy, and utilizes optimal data analysis processes to extract accurate information from query results.

FIG. 1 illustrates an example high-level functional block diagram representing an embodiment of an automated Query and Extraction (QE) Platform X100 for verifying/cleansing a specific data store. The platform formulates various query logic via a Query Logic Engine X110 that is contextual for the given task to be performed. An example contact data store verification query is "Does [John Doe] still work at Google" and "Is John Doe's email address still [john doe@gmail.com]".

Formulated queries are submitted via the platform to a one or more Online Network Resources X170 directly or through a Proxy X120 (which may include one or more proxy servers configured to serve as a hub through which Internet requests are processed). Advantageously, a proxy server, such as Proxy X120, may perform network queries on behalf of the platform X100 and the proxy may further enable the QE Platform X100 to remain anonymous, manage load, etc.

Query responses are received by the QE platform X100 and the responses are parsed by an Extraction Engine X130. Parsed responses are analyzed by the Extraction Engine X130 and accurate and current profile and contact information is extracted, and the results may be stored to a local Data Store X140 or transmitted over a Data Network X160 to a client's Data Store X150 (X140 and/or X150 may comprise a cloud-based server).

Figure 2:
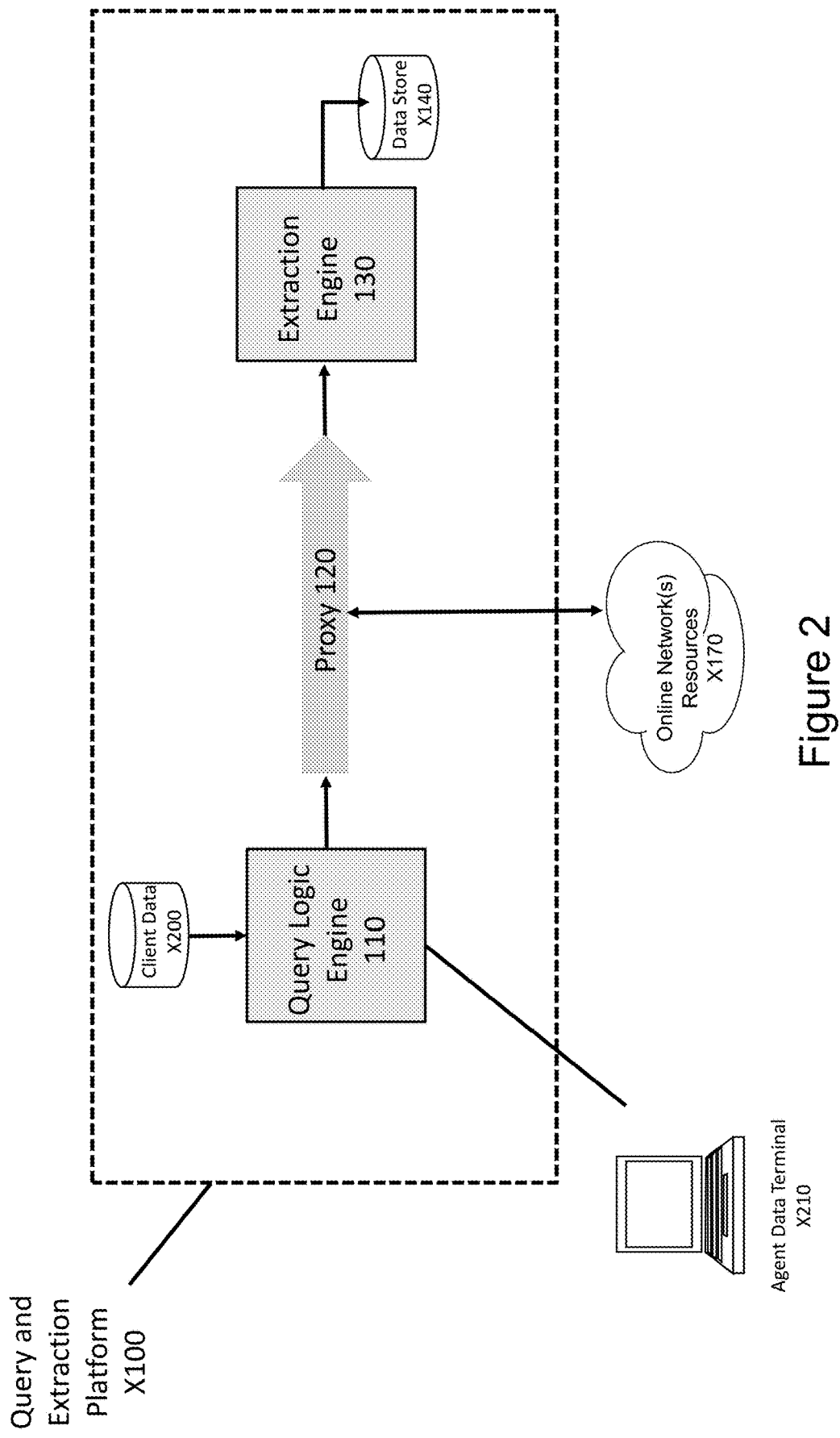
FIG. 2 illustrates an example embodiment of a Query and Extraction platform.

FIG. 2 illustrates a more detailed view of aspects of an example embodiment of an automated Query and Extraction platform X100 used for verifying/cleansing information from a data source (e.g., a data store of a client of an enterprise using the QE platform X100). The data verification process begins with a Client's Source X200.

Client's Source X200, may for example, comprise a data store (or other computer related media performing the function of a data repository) which houses the information which needs to be verified. In an example embodiment, the consumer client profile attributes that may be verified may include (but is not limited to) some or all of the following attributes: consumer age, income, home value, marital status, zip code, other demographic and psychographic data, web browsing data, personal data, social networking data, and/or other data). Optionally, business client profile attributes may be verified, including, but not limited to, some or all of the following attributes: NAICS/SIC codes, DUNS number, CAGE code, number of employees, contact title, business expense, revenue, sales volume, credit rating, geography, and other firmographic, demographic, and psychographic data. Optionally, the consumer contact information may be verified including, but not limited to, some or all of the following information: home phone number, mobile phone number, work phone number, email address(es) (home, work, others), home mailing address, social media address (Facebook, Instagram, Twitter, Tictok, etc), etc. Optionally, the following business contact information may be verified including but not limited to: work phone number, work phone extension number, fax number, work mailing address, company name, company mailing address (including department, suite, etc.), LinkedIn account, social media address, etc.

Further, the Client Source X200 data may be read into or transferred into the Query Logic Engine X110. The Query Logic Engine X110 dynamically formulates a set of data verification queries based at least in part on certain instructions and parameters entered or selected by an operator via a user interface X210. Optionally, these instructions and parameters define the data types (e.g., consumer data or business data), and sub-data types (e.g., contact data or profile data), and further sub-data types (e.g., mobile phone number, mailing address, zip code, etc.)

The Query Logic Engine X110 submits the formatted query requests to a one or more Online Network Sources X170 either directly or via a Proxy X120. Advantageously, these network platforms may include a large quantity of current subscriber information including contact and profile information regarding said subscribers.

It will be understood that Online Network Source X170 may comprise one or more various search engines, including but not limited to: YAHOO!, GOOGLE, BING, YANDEX, BAIDU, AOL, EXCITE, DUCKDUCKGO, LYCOS, WEB CRAWLER, INFOSPACE, etc. Online network resources X170 may further comprise various social media networks including but not limited to: FACEBOOK, INSTAGRAM, WHATSAPP, PINTEREST, REDDIT, FLICKR, TICTOK, TWITTER, etc. Online network resources X170 may further comprise various professional networks including but not limited to: LINKEDIN, DOOSTANG, OPPORTUNITY, MEETUP, etc. Online network resources X170 may further comprise various dating networks including but not limited to: MATCH, EHARMONY, SINGLESNET, YAHOO! PERSONALS, etc.

Based at least in part on a one or any combination of attributes of a customer or customer prospect, the system queries one or more online network data stores (e.g., one or more data stores that store demographic, psychographic, web browsing data, personal data, social networking data, and/or other data further described herein) to verify or determine one or more implicitly and/or explicitly defined attributes associated with the customer or customer prospect (e.g., demographic attributes, psychographic attributes, web browsing attributes, other personal attributes, social networking attributes, and/or other attributes as further described herein).

Figure 3:
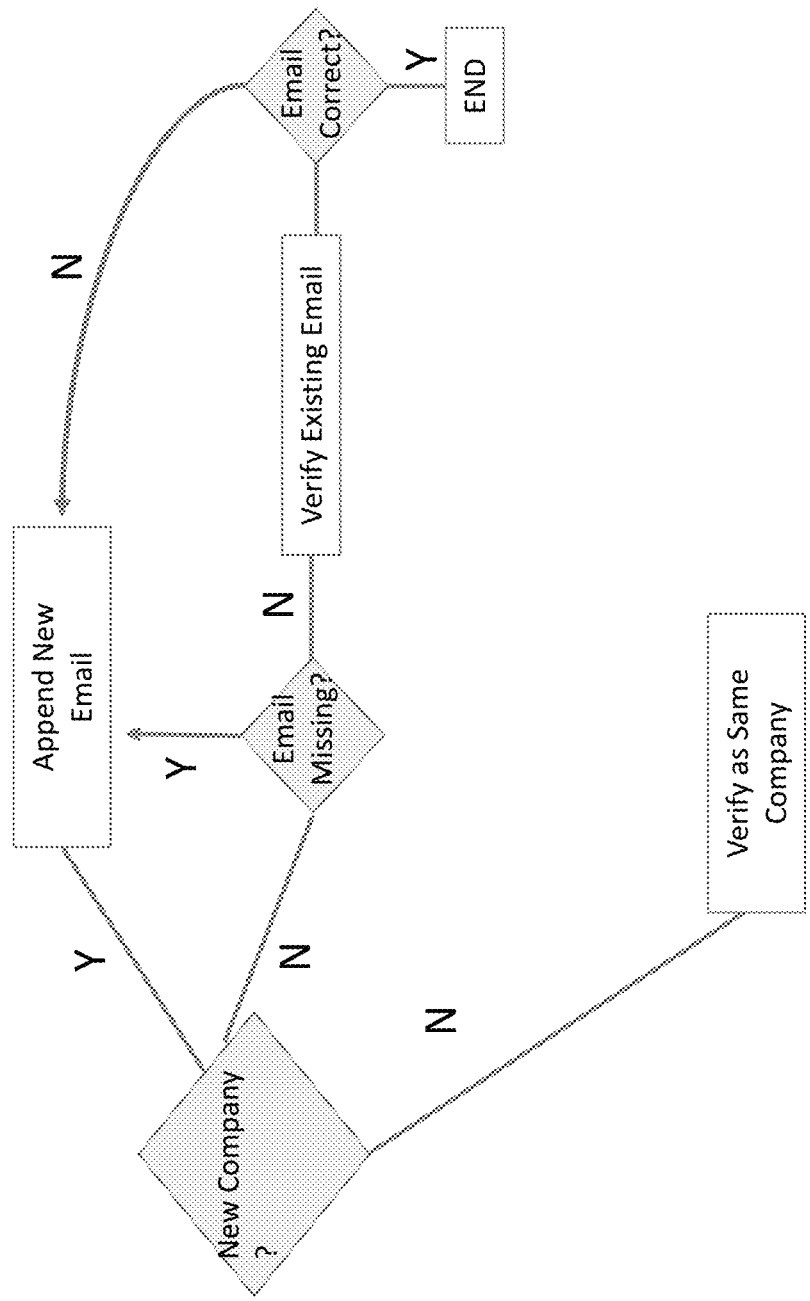
FIG. 3 illustrates an example embodiment of decision tree logic used in an example embodiment of a Query and Extraction platform.

The output/response from the Online Network Source(s) X170 query is parsed by the Extraction Engine X130 and the parsed data is compared against input data X200 as further described in FIG. 3.

FIG. 3 illustrates an example embodiment of a decision tree logic applied to the Online Network Source X170 parsed output results. In this example, an attribute of the data is a company name associated with an individual of interest. The company's name associated with an individual of interest from data source X200 is compared in the Extraction Engine X130 against the query results. Further to this example, if the extracted company name matches the company name in the Data Source X200, the record is flagged as verified. In this example, if there is a match but the email address of the individual is missing and a new email is discovered in the search a new email is added to the individual's record. Optionally, if an email address is present in the individual's record, the Extraction Engine X130 may at least partially verify that the individual's email is correct, by for example, comparing the individual's email's domain name to the known email address for the company (optionally, by performing one or more additional search queries) or using other techniques of validating an email (e.g., using event data, which may include hard bounces, deliveries, engagement, syntax validation, typographical error detection (e.g., detecting a common misspelling of a domain name), and/or DNS queries for valid domains, etc.). If the email address appears to be correct, the verification of the individual's email address is recorded in the results.

Figure 4:
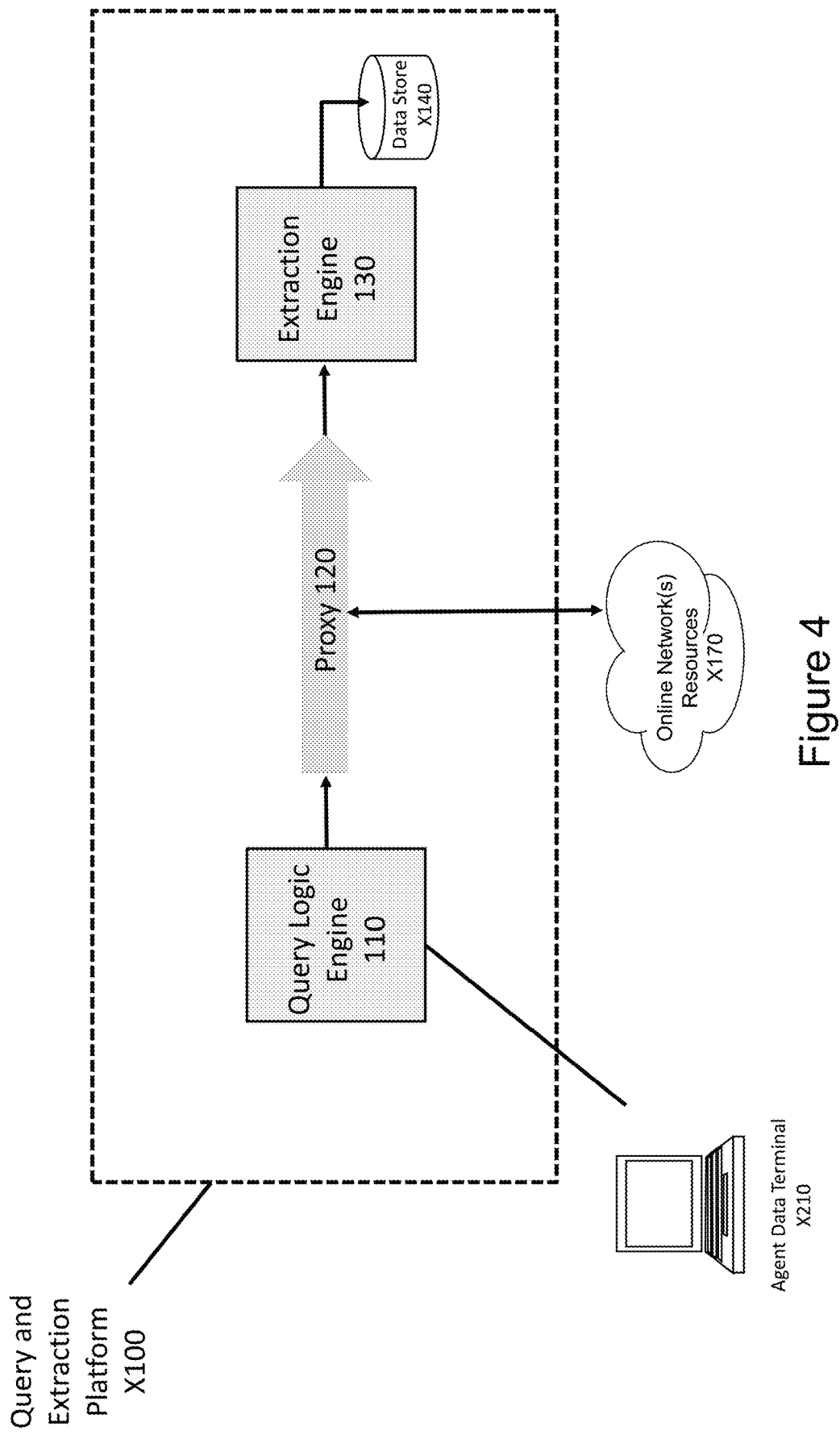
FIG. 4 illustrates an example embodiment of a Query and Extraction platform.

FIG. 4 illustrates a more detailed view of aspects of an example embodiment of an automated Query and Extraction platform X100 used for generating a new list of customer prospects or leads for a certain market, for example agriculture equipment. In this example, the input to the Query Logic Engine X110 includes a set of criteria defining the characteristics of the expected or sought after leads, for example, farmers located in 3 states in the Midwest with annual sales greater than 7 figures.

Further to the example embodiment, the Query Logic Engine X110 dynamically formulates a set of data verification queries based at least in part on certain instructions and parameters entered or selected by an operator via a user interface X210. Optionally, these instructions and parameters define lead criteria (e.g., in this example, specific Midwest states, farmer sales, farmer irrigation methods, historic crops, etc.) and the sought after output data types (e.g., consumer data or business data), and sub-data types (e.g., contact data or profile data), and further sub-data types (e.g., mobile phone number, mailing address, zip code, etc.).

The Query Logic Engine X110 submits the formatted query requests to an Online Network Source X170 directly or via a Proxy X120.

The output/response from the Online Network Source X170 search query is parsed by the Extraction Engine X130 and a set of initial leads is stored in data store X140. Optionally, the list of leads in the data store X140 are scored with a data quality confidence level. If the confidence level is below a certain specified threshold (e.g., 60 percent, 70 percent, or other threshold), certain verification steps as described herein may be further applied, for example, an additional set of verifications, such as verifications of a leads contact and/or profile information as described herein above. Optionally, if the confidence threshold falls below a specified threshold or is determined to be invalid, the corresponding data may be deleted from memory (e.g., overwriting the data with other data) thereby conserving memory resources.

Figure 5:
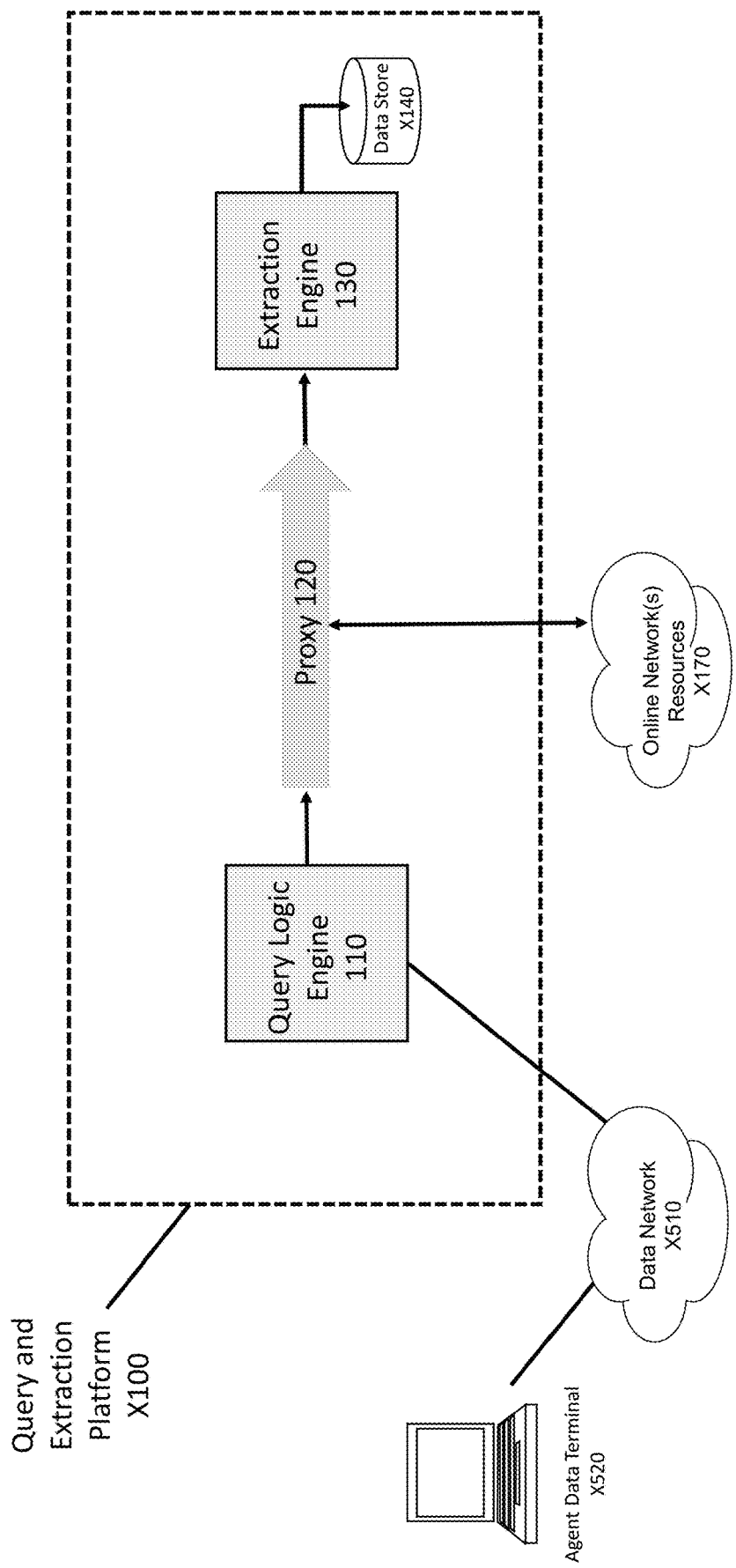
FIG. 5 illustrates an example embodiment of a Query and Extraction platform.

In another example embodiment, as illustrated in FIG. 5, an enterprise or service provider enables access to the Query and Extraction platform X100 over a Data Network X510 including for examples, a public network or private network, a local-area network, etc., to various clients. In this example, a user-friendly client dashboard X520 is available on various computing platforms (e.g., personal computers, mobile phones, iPads, etc.) Clients can access the QE platform directly and verify their contact and profile data or generate new leads in real-time. Further to this example, a client may launch a new demand generation marketing campaign. The leads entered into the marketing campaign are provided in real-time by QE platform X100. Advantageously, the example QE platform serves as a virtual data store delivery high quality leads, customer profile, and customer contacts (e.g., that are both relevant and that include accurate, up to date contact information and current employer information). Optionally, for example in a service provider environment, the QE platform X100 is available about 24 hours a day, 7 days a week, and 365 days a year, with an availability rate of greater than 99.9% of the time.

Thus, as described above, systems and methods are described that enable a means to verifying customer profile and contact data. Systems and methods are further described that enable the creation of customer prospect lists and their associated profiles and contact data. In addition, systems and methods are described that enable real-time access to these verification and lead generation methods and systems. Advantageously, the embodiments described above improve existing marketing and sales campaigns while reducing costs.

Further, because stored data that has been determined not to be accurate or to no longer be accurate (e.g., is stale) is not used in a marketing campaign, corresponding computer processing, memory, and network resource utilization is not wastefully used with respect to such inaccurate or stale data. For example, inaccurate or stale data may be deleted from memory. Further, certain communications may be inhibited to a given lead contact in response to determining that certain associated information (e.g., lead employer, lead email address, lead phone number, etc.) is not correct.

Although this disclosure has been described in terms of certain example embodiments and applications, other embodiments and applications that are apparent to those of ordinary skill in the art, including embodiments and applications that do not provide all of the benefits described herein, are also within the scope of this disclosure.

The methods and processes described above may be embodied in, and fully automated via, software code modules executed by one or more general purpose computers or processors, including mobile phones. The code modules may be stored in any type of computer-readable medium or other computer storage device. Some or all of the methods may alternatively be embodied in specialized computer hardware. Further, components and tasks described herein can be implemented as web services. Data described herein as being received or generated by a computer system may optionally be stored in and accessed from computer readable memory.

The computers described herein (including servers, terminals, phones, interactive televisions, etc.) can include one or more central processing units (CPUs) that execute program code and process data, memory, including volatile memory, such as random access memory (RAM) optionally for temporarily storing data and data structures during program execution, and/or non-volatile memory, such as a hard disc drive, optical drive, or FLASH drive, optionally for storing programs and data, including databases, which may be referred to as "data stores" and/or a "system database," and a wired and/or wireless network interface for accessing an intranet and/or Internet. The computers can include a display for displaying user interfaces, data, and the like, and one or more user input devices, such as a keyboard, mouse, pointing device, microphone and/or the like, used to navigate, provide commands, enter information, provide search queries, and/or the like.

Although the present invention and its advantages have been described in detail, it should be understood that various changes, substitutions and alterations can be made herein without departing from the spirit and scope of the disclosed features. For example, many of the processes discussed above can be implemented in different methodologies and replaced by other processes, or a combination thereof. As another example, other forms of signal modulation could be used instead of frequency modulation. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices illustrated can be made without departing from the spirit of the disclosure. As can be recognized, certain embodiments described herein can be embodied within a form that does not provide all of the features and benefits set forth herein, as some features can be used or practiced separately from others.

What is claimed is:

1. A virtual data store system, comprising:
a network interface;
at least one processing device operable to:
    access, using the network interface, a source database of existing data of a plurality of contact records comprising contact data and one or more additional attributes, wherein the source database is associated with a first entity that is enabled to utilize the virtual data store system as a contact database of the first entity;

dynamically formulate a verification query with respect to a first contact record in the source database;

transmit, over a network using the network interface, the dynamically formulated verification query to one or more online network sources via a proxy service to aid in enhancing load balancing;

receive a response, via the proxy service, to the dynamically formulated verification query;

parse the response to the dynamically formulated verification query and generate a corresponding decision tree;

using the decision tree, determine that a first item of data missing from the first contact record is present in the parsed response;

at least partly in response to determining that the first item of data missing from the first contact record is present in the parsed response, supplement the first contact record with the first item of data from the parsed response;

at least partly in response to determining that a second item of data in the first contact record is potentially present in the parsed response, generate a corresponding confidence score that indicates a likelihood the second item of data is present in the parsed response, determine if the confidence score that indicates a likelihood the second item of data is present in the parsed response is below a first threshold, at least partly in response to determining that the confidence score is below the first threshold, perform a subsequent verification operation to verify that the second item of data is present in the parsed response, at least partly in response to determining that the subsequent verification operation failed to determine that the second item of data is present in the parsed response, delete the second item of data from memory to conserve memory resources;

at least partly in response to determining that a third item of data in the first contact record is present in the parsed response, record a verification indication associated with the third item of data; and enable the first entity to utilize the first contact record to transmit an electronic communication to an electronic destination associated with the first contact record.

2. The virtual data store system as defined in claim 1, wherein the dynamic formulation of the verification query comprises formulating the verification query with an output data type, a sub-data type, and a sub-sub-data type.

3. The virtual data store system as defined in claim 1, wherein the dynamic formulation of the verification query comprises using one or more parameters that define one or more data types.

4. The virtual data store system as defined in claim 1, wherein the system is further configured to verify an email address in the first contact record by comparing a domain name of the email address with a domain name of an employer associated with a person corresponding to the first contact record.

5. The virtual data store system as defined in claim 1, wherein the system is further configured to verify whether an email address is valid or not by detecting a hard bounce of a communication to the email address, a delivery of a communication to the email address, a user engagement with a communication to the email address, a syntax validation, and/or a typographical error.

6. The virtual data store system as defined in claim 1, wherein the additional attribute comprises an industry code and/or a social media link.

7. The virtual data store system as defined in claim 1, wherein the one or more online network sources comprises a social networking source and/or a search engine.

8. A computerized method, the method comprising:

accessing, using computer system via a network interface, a source database of existing data of a plurality of contact records comprising contact data and one or more additional attributes, wherein the source database is associated with a first entity that is enabled to utilize the virtual data store system as a contact database of the first entity;

dynamically formulating a verification query with respect to a first contact record in the source database;

transmitting, over a network using the network interface, the dynamically formulated verification query to one or more online network sources via a proxy service thereby aiding in enhancing load balancing;

receiving a response, via the proxy service, to the dynamically formulated verification query;

parsing the response to the dynamically formulated verification query and generating a corresponding decision tree;

determining, using the decision tree, that a first item of data missing from the first contact record is present in the parsed response;

at least partly in response to determining that the first item of data missing from the first contact record is present in the parsed response, supplementing the first contact record with the first item of data from the parsed response;

at least partly in response to determining that a second item of data in the first contact record is potentially present in the parsed response, generate a corresponding confidence score that indicates a likelihood the second item of data is present in the parsed response, determining if the confidence score that indicates a likelihood the second item of data is present in the parsed response is below a first threshold, at least partly in response to determining that the confidence score is below the first threshold, performing a subsequent verification operation to verify that the second item of data is present in the parsed response, at least partly in response to determining that the subsequent verification operation failed to determine that the second item of data is present in the parsed response, overwriting the second item of data;

at least partly in response to determining that a third item of data in the first contact record is present in the parsed response, recording a verification indication associated with the third item of data; and enabling the first entity to utilize the first contact record to transmit an electronic communication to an electronic destination associated with the first contact record.

9. The computerized method as defined in claim 8, wherein the dynamic formulation of the verification query comprises formulating the verification query with an output data type, a sub-data type, and a sub-sub-data type.

10. The computerized method as defined in claim 8, wherein the dynamic formulation of the verification query comprises using one or more parameters that define one or more data types.

11. The computerized method as defined in claim 8, the method further comprising verifying an email address in the first contact record by comparing a domain name of the email address with a domain name of an employer associated with a person corresponding to the first contact record.

12. The computerized method as defined in claim 8, the method further comprising verifying whether an email address is valid or not by detecting a hard bounce of a communication to the email address, a delivery of a communication to the email address, a user engagement with a communication to the email address, a syntax validation, and/or a typographical error.

13. The computerized method as defined in claim 8, the method further comprising, wherein the additional attribute comprises an industry code and/or a social media link.

14. The computerized method as defined in claim 8, the method further comprising, wherein the one or more online network sources comprises a social networking source and/or a search engine.

15. A non-transitory computer-readable medium comprising instructions that when executed by a computer device, cause the computer device to perform operations comprising:
   accessing, a source database of existing data of a plurality of data records comprising contact data and one or more additional attributes, wherein the source database is associated with a first entity that is enabled to utilize the virtual data store system as a contact database of the first entity;
   dynamically formulating a verification query with respect to a first data record in the source database;
   transmitting the dynamically formulated verification query to one or more online network sources via a proxy service thereby aiding in enhancing load balancing;
   receiving a response, via the proxy service, to the dynamically formulated verification query;
   parsing the response to the dynamically formulated verification query and generating a corresponding decision tree;
   determining, using the decision tree, that a first item of data missing from the first data record is present in the parsed response;
   at least partly in response to determining that the first item of data missing from the first data record is present in the parsed response, supplementing the first data record with the first item of data from the parsed response;
   at least partly in response to determining that a second item of data in the first data record is potentially present in the parsed response, generating a corresponding confidence score that indicates a likelihood the second item of data is present in the parsed response,
   determining if the confidence score that indicates a likelihood the second item of data is present in the parsed response is below a first threshold, at least partly in response to determining that the confidence score is below the first threshold, performing a subsequent verification operation to verify that the second item of data is present in the parsed response;
   at least partly in response to determining that the subsequent verification operation failed to determine that the second item of data is present in the parsed response, overwriting the second item of data;
   at least partly in response to determining that a third item of data in the first contact record is present in the parsed response, recording a verification indication associated with the third item of data; and
   enabling the first entity to utilize the first data record to transmit an electronic communication to an electronic destination associated with the first data record.

16. The non-transitory computer-readable medium as defined in claim 15, wherein the dynamic formulation of the verification query comprises formulating the verification query with an output data type, a sub-data type, and a sub-sub-data type.

17. The non-transitory computer-readable medium as defined in claim 15, wherein the dynamic formulation of the verification query comprises using one or more parameters that define one or more data types.

18. The non-transitory computer-readable medium as defined in claim 15, the operations further comprising verifying an email address in the first data record by comparing a domain name of the email address with a domain name of an employer associated with a person corresponding to the first data record.

19. The non-transitory computer-readable medium as defined in claim 15, the operations further comprising verifying whether an email address is valid or not by detecting a hard bounce of a communication to the email address, a delivery of a communication to the email address, a user engagement with a communication to the email address, a syntax validation, and/or a typographical error.

20. The non-transitory computer-readable medium as defined in claim 15, the operations further comprising, wherein the additional attribute comprises an industry code and/or a social media link.

21. The non-transitory computer-readable medium as defined in claim 15, the operations further comprising, wherein the one or more online network sources comprises a social networking source and/or a search engine.

\* \* \* \* \*